United States Patent Office
3,403,050
Patented Sept. 24, 1968

3,403,050
WATER REPELLENT COMPOSITIONS FOR POROUS SUBSTRATES
Rajendra N. Chadha, Tecumseh, Mich., assignor to Stauffer Chemical Company
No Drawing. Filed Dec. 28, 1964, Ser. No. 421,715
3 Claims. (Cl. 117—161)

ABSTRACT OF THE DISCLOSURE

This invention concerns a water repellent comprising the reaction product of an allyl alkoxysilane, a tetraalkoxysilane and water.

---

This invention consists of novel, water soluble, water repellent compositions. More particularly, the water repellent compositions of this invention contain certain alkenyl alkoxy silanes.

The primary object of this invention is to provide a novel water repellent composition. Another object of this invention is to provide a water repellent composition that is applicable from an aqueous solution. Another object is to provide a composition employing alkenyl alkoxy silanes. Another object is to provide a method of making alkenyl alkoxy silanes which method produces a mixture of products in the proper proportions for direct incorporation into a water repellent composition. These objects, as well as other objects which are apparent from the following description, are satisfied by this invention.

This invention consists of a composition of matter suitable for use as a water repellent coating, said composition consisting essentially of a mixture of (A) a compound of the formula $Z_xSi(OR)_{4-x}$ in which each Z is an unsaturated aliphatic monovalent hydrocarbon radical of 2 to 4 carbon atoms, preferably an allyl radical, each R is an alkyl group containing from 1 to 2 carbon atoms and $x$ has a value ranging from 1 to 3, (B) a compound of the formula $Si(OR)_4$ in which each R is as above defined, A and B being present in a volume ratio ranging from 1:3 to 3:1, and (C) water, the total volume concentration of (A) and (B) in the mixture ranging from 1 to 70 percent.

The alkoxy silanes employed in this invention can be easily prepared by a Grignard-type synthesis using the corresponding hydrocarbon chloride and an alkyl orthosilicate within the definition of component B above. The general reaction is

$ZCl + Si(OR)_4 + Mg \rightarrow Z_xSi(OR)_{4-x} + Mg(OR)Cl$

Generally, heating in the range of from about 50° C. to about 130° C. is necessary. It may be necessary to add a small amount of a reagent such as methyl magnesium chloride to initiate the reaction. The result of this synthesis is a mixture comprising mono-Z-substituted trialkoxy silane, di-Z-substituted dialkoxy silane and tri-Z-substituted alkoxy silane, i.e., component A, and unreacted alkyl orthosilicate, i.e., component B.

Alternatively, the reaction of the hydrocarbon chloride and alkyl orthosilicate can be promoted by a rearrangement catalyst such as sodium ethoxide, potassium hydroxide or tetrabutyl phosphonium hydroxide. When the rearrangement catalyst is employed, the reaction mixture is refluxed for 2 to 3 hours. The product in any case is distilled off, preferably in the presence of a high-boiling solvent such as biphenyl. The distilled product is pure, since the catalyst residues remain in the high-boiling solvent. It has been found unexpectedly that both the product mixtures from either preparation can be employed in water repellent compositions.

Compounds which can be present in component A include, for example, allyl trimethoxy silane, allyl triethoxy silane, vinyl trimethoxy silane, butadienyl trimethoxy silane, diallyl dimethoxy silane, divinyl diethoxy silane, dibutadienyl dimethoxy silane, trivinyl methoxy silane, triallyl ethoxy silane and mixtures of the above. Although it is commercially inconvenient to have mixed alkoxy groups in any single compound, such a variation would not exclude the resulting compounds from the definition of component A, and the resulting compounds would be operative in this invention.

Component B can be methyl orthosilicate, ethyl orthosilicate or a mixture thereof. As with the compounds of conmponent A, the alkoxy groups in any orthosilicate in component B can be mixed as, for example, in dimethoxy diethoxy silane or triethoxy methoxy silane.

In the preparation of the compositions of this invention, water (component C) is added to the mixture of components A and B in volume amounts equal to at least about one-half and generally equal to the volume of the mixture of components A and B. The volumes of water employed in this invention should be sufficient to give product concentration equivalent to a concentration of A and B in the mixture of no more than about 70 percent by volume. Heat is liberated in the course of this water addition due at least in part to the hydrolysis of alkoxy groups from the silanes of component A and the silicates of component B. It has been found that after the first hydrolysis of the components A and B, more water can be added at any time prior to application of the composition to a surface to be treated with the water repellent. In order to retain the water repellent properties of the concentrated composition consisting essentially of components A, B and C, the system should not be diluted with water to the point where the volume concentration of A and B combined would be less than 1 percent by volume of the total. On the other hand, it is generally impractical to apply the compositions of this invention in concentrations of A and B combined above 10 percent by volume. Preferably, the concentration of A and B combined is no more than about 5 percent by volume.

In the treating of a porous product such as concrete to render it water repellent, the aqueous solution of the present invention is conveniently applied at a volume concentration of about 5 percent of the silicon-containing materials in water. This concentration may readily be varied over a wide range, from about 1 percent to about 70 percent, and it is one of the advantages of the present invention that such variation is possible. In other words, water can be added in an amount ranging from about 0.4 to about 100 times the combined volume of the silane and silicate components.

It has been found that the presence of an alcohol facilitates hydrolysis of the silane and renders the silane and silicate mutually miscible thereby facilitating all the hydrolysis and condensation reactions which take place in the system of this invention. The benefit derived from the presence of inherent alcohol in the system can be substantially increased by adding as an additional ingredient an alcohol D containing no more than two carbon atoms, i.e., methanol and/or ethanol. The alcohol ingredient can be added in an amount up to twice (200%) the combined volumes of A and B. Alcohol is preferably present in an amount ranging from about 50 to 150 volume percent, more preferably from about 80 to about 120 volume percent, based on the volume of combined A and B.

It has also been found that when the aqueous system is made acidic in the pH range of about 2 to 6, preferably 2 to 3 by the addition of an acid E, it is substantially more stable than a neutral or basic system. One method of making the system acid is the use of dilute solutions of inorganic acids such as HCl or sulfuric acid in place of water as set forth above. Alternatively, substituted acids of organic, inorganic or organometallic origin can be employed. Preferred among these are diethylhydrogenphosphite or ethyldihydrogenphosphite. Such a compound can be mixed with the silane and silicate even in an alcohol solution without affecting the pH of the system, but the addition of water hydrolyzes the phosphite and turns the system acidic. An organic acid should not be present in an amount greater than about 10 percent by volume and is preferably employed in an amount ranging from about 0.01 to about 3 percent. While an ultimate pH of about 3 appears to be the most desirable, a pH up to about 6 shows improvement in solution stability over neutral or basic solutions.

Where a cellulosic surface as in paper or cloth fabric is to be treated with a composition of this invention, it is desirable to render the system basic immediately prior to use by the addition of a weak base F such as an amine, e.g., triethylene diamine, triethyl amine or ethanol amine. The pH of the system can be raised to as high as about 10 for this use.

In order to improve the water repellency of the present invention, it is often desirable to incorporate into the reaction-mixture prior to incorporation of the water a peroxide catalyst, such as benzoyl peroxide, or 2,5-bis(tertbutyl-peroxy)-2,5-dimethyl hexane, to a mixture of the silane and silicate components. The peroxide cross-linker is designated in the claims as component G. Such additions greatly enhance the sought-after properties of the present invention. The peroxides are used in an amount not greater than about 1 weight percent based on the total mixture and are preferably utilized in amounts no greater than about 0.5 weight percent.

The present invention does not require any special mixing equipment or any difficult mixing technique in that the components are simply added to the reactor with agitation. Furthermore, the equipment used for mixing may be easily cleaned by simply rinsing.

The preferred technique for the use of this invention is the preparation of a relatively concentrated, preferably acidic, water solution which is diluted as desired. After being diluted with water, the mixture is not flammable and has the additional advantages of being practically neutral and nontoxic.

One method of utilizing the present invention in the coating of materials is to prepare an undiluted mixture of components A and B, preferably in volume amount ranging from 1:3 to 3:1 parts. The concentrated mixture is readied for use by the addition of water in an amount equal to at least about one-half the total volume of combined components (A) and (B), preferably an equal volume of water, or it can be stored for an indefinite period of time. It is only upon mixing the silane-silicate mixture with water that reaction takes place so as to yield a water repellent product.

The compositions of this invention may be applied as a coating to any surface, especially a porous surface such as paper, wood, concrete, masonry, limestone or marble, in any of the conventional ways such as brushing, spraying or flooding. While these compositions are water soluble, evaporation of water from a treated surface leaves a tough water repellent film.

The success of the present invention is believed to be in the intermolecular condensation polymerization caused by the elimination of $H_2O$ and/or alcohol between the silicon-containing moieties. Because the same success in producing a water repellent coating is achieved when the drying takes place under a nitrogen atmosphere, the possibility that the reaction involves free radical formation based on oxygen in the air is eliminated. The same success in producing a water repellent coating is achieved where the drying of the water repellent coating takes place in an oxygen or nitrogen atmosphere.

The reaction of water with the alkoxy silane and/or the alkyl orthosilcate apparently produces alcohol and silanol groups. The silanol groups condense with each other to form Si-O-Si linkages and water. The silanol groups also condense with alkoxy groups in the alkoxy silane and/or the alkyl orthosilicate to form alcohols and Si-O-Si linkages. The above described theory is to be considered only as a possible explanation and is not intended to limit the invention.

This invention is further illustrated by the following examples. However, these examples are not intended to limit this invention, which is properly delineated in the appended claims. Unless otherwise stated, all measurements are by volume.

EXAMPLE I

A mixture of 6 gram-moles of allyl chloride and 5 gram-moles of ethyl orthosilicate is added slowly over a 5 hour period with agitation to a mixture of 5 gram-moles of magnesium, 20 grams of ethyl orthosilicate and 5 ml. of methyl magnesium chloride heated to 50° C. The temperature during the addition rises to a miximum of 120° C. and is prevented from dropping below 80° C. by heating. The reaction product is filtered and then washed with ether which is then stripped off. The reaction product is found to be by volume, 51.1 percent tetraethylorthosilicate, 26.3 percent monoallyltriethoxysilane, 17.5 percent diallyldiethoxysilane and 5.1 percent triallylethoxysilane.

The monoallyltriethoxysilane and tetraethylorosilicate are distilled off. To one part of each of three solutions of monoallyltriethoxysilane and ethylorthosilicate, in volume ratios of 2:1, 1:1 and 1:2, are added one part methanol, 0.007 part diethylhydrogen phosphite and one part water. After the solutions clear and exotherm is completed, 17 parts of additional water are added to each of the solutions.

Each of the resulting products is brushed onto separate concrete slabs. After air drying, each of the concrete slabs possesses a water repellent and wear-resistant coating. When this experiment is repeated using the three original solutions prior to dilution with the 17 parts of additional water, similar results are obtained.

EXAMPLE II

To a mixture of 6 gram-moles of allyl chloride and 5 gram-moles of ethyl orthosilicate is added 60 grams of sodium ethoxide with stirring. The components are refluxed for 3 hours at 60° C. A reaction product is formed, and after distillation, the distillate is found to consist of by volume, 27 percent monoallyltriethoxysilane, 8 percent diallyldiethoxysilane, 5 percent triallylethoxysilane and 60 percent tetraethylorthosilicate.

To one part by volume of this mixture are added 1.5 parts ethanol and 0.11 part diethylhydrogen phosphite. The resultant mixture is stable in a closed container for at least a week. One part by volume of water is then added producing an exothermic reaction. After the solution clears and exortherm is completed, 13 parts of additional water are added.

Both the concentrated and dilute reaction products are brushed onto concrete slabs. After drying, the test slabs possess water repellent and wear-resistant coatings.

EXAMPLE III

From the remaining portion of the original product mixture of Example II above, the monoallyltriethoxysilane and tetraethylorthosilicate are distilled off and mixed in equal volumes. This mixture is stable in a closed container for over a week. When one part by volume of this mixture is mixed with 0.5 part acidic water (0.005 NHCl), an exothermic reaction takes place. When some of the product of this reaction is sprayed on marble slabs and allowed to dry, the resulting coating on the marble is water repellent.

When the remainder of the product of the above exothermic reaction is diluted with 48.5 parts of water and bricks are immersed in the dilute solution and allowed to air dry, the brick surfaces are found to be water repellent.

EXAMPLE IV

When the experiments described in Example III are repeated three times, including in the coating solutions 1.2 parts, 0.8 part and 0.5 part by volume methanol respectively, similar results are obtained.

EXAMPLE V

Ethanolamine is added to a dilute solution similar to that described in Example III until the pH of the solution reaches 8. The resulting solution is applied to paper test strips which are then permitted to air dry. The resulting coatings on the paper strips are water repellent.

EXAMPLE VI

The product preparation of Example I is repeated except that after the exorthermic reaction, a 2 percent solution of 2,5-bis(tert-butyl-peroxy)-2,5-dimethylhexane in isopropyl alcohol is added to the product in an amount equal to 0.5 percent by weight based on the weight of (A) and (B) combined.

The reaction product is brushed onto a paper test strip. After drying at 80° C., the test strip possesses a water repellent and wear resistant surface.

Having thus described my invention, I claim:

1. A porous substrate rendered water repellent by the application thereto of a composition comprising the reaction product of (A) a compound of the formula $Z_xSi(OR)_{4-x}$ in which Z is an allyl radical, R is an alkyl group containing from 1 to 2 carbon atoms and $x$ has a value ranging from 1 to 3, (B) a compound of the formula $Si(OR)_4$ in which each R is as above defined, (A) and (B) being present in a volume ratio ranging from 1:3 to 3:1, and (C) water, the total volume concentration of (A) and (B) in the mixture ranging from 1 to about 70 percent.

2. A porous substrate rendered water repellent by the application thereto of a composition comprising the reaction product of (A) a compound of the formula $Z_xSi(OR)_{4-x}$ in which Z is an allyl radical, R is an alkyl group containing from 1 to 2 carbon atoms and $x$ has a value ranging from 1 to 3, (B) a compound of the formula $Si(OR)_4$ in which each R is as above defined, (A) and (B) being present in a volume ratio ranging from 1:3 to 3:1, and (D) an alcohol containing from 1 to 2 carbon atoms in an amount equal to from 50 to 150 percent by volume of the volume of (A) and (B) combined.

3. A porous substrate rendered water repellent by the application thereto of a composition comprising the reaction product of (A) a compound of the formula $Z_xSi(OR)_{4-x}$ in which Z is allyl, R is an alkyl group containing from 1 to 2 carbon atoms and $x$ has a value ranging from 1 to 3, (B) a compound of the formula $Si(OR)_4$ in which each R is as above defined, (A) and (B) being present in a volume ratio ranging from 1:3 to 3:1, (C) water, (D) an alcohol containing from 1 to 2 carbon atoms in an amount equal to from 50 to 150 percent of the volume of (A) and (B) combined and (E) an acid in an amount sufficient to make the pH of the composition from 2 to 6, the volume concentration of (A) and (B) combined in the composition ranging from 1 to 70 percent.

References Cited

UNITED STATES PATENTS

| | | | |
|---|---|---|---|
| 3,046,242 | 7/1962 | Santelli | 260—29.2 |
| 3,310,417 | 3/1967 | Lerner et al. | 260—29.2 |
| 2,595,730 | 5/1962 | Swiss et al. | 260—46.5 |
| 2,679,495 | 5/1954 | Bunnell | 117—123 |
| 3,228,903 | 1/1966 | Dennis | 260—29.2 |

MURRAY TILLMAN, *Primary Examiner.*

J. L. WHITE, *Assistant Examiner.*